(12) United States Patent
Yen et al.

(10) Patent No.: US 11,604,525 B2
(45) Date of Patent: Mar. 14, 2023

(54) DISPLAY PANEL COMMON ELECTRODE REGIONS CONNECTED BY NECKING REGION

(71) Applicant: Innolux Corporation, Miao-Li County (TW)

(72) Inventors: Chung-Wen Yen, Miao-Li County (TW); Hsia-Ching Chu, Miao-Li County (TW); Kuan-Feng Lee, Miao-Li County (TW); Yu-Sheng Tsai, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 38 days.

(21) Appl. No.: 17/131,679

(22) Filed: Dec. 22, 2020

(65) Prior Publication Data

US 2021/0109621 A1    Apr. 15, 2021

Related U.S. Application Data

(63) Continuation of application No. 15/925,794, filed on Mar. 20, 2018, now Pat. No. 10,908,717.

(30) Foreign Application Priority Data

Mar. 21, 2017   (CN) .......................... 201710168848.9

(51) Int. Cl.
*G06F 3/041*   (2006.01)
*G09G 3/20*    (2006.01)

(52) U.S. Cl.
CPC .............. *G06F 3/0412* (2013.01); *G09G 3/20* (2013.01); *G02F 2201/121* (2013.01)

(58) Field of Classification Search
None
See application file for complete search history.

(56) References Cited

U.S. PATENT DOCUMENTS

| | | | |
|---|---|---|---|
| 2016/0378233 A1* | 12/2016 | Huo ...................... | G06F 3/0412 345/174 |
| 2017/0177125 A1* | 6/2017 | Kim ...................... | G06F 3/0412 |
| 2018/0095566 A1* | 4/2018 | Lee ........................ | H01L 27/322 |

* cited by examiner

*Primary Examiner* — Amare Mengistu
*Assistant Examiner* — Sarvesh J Nadkarni
(74) *Attorney, Agent, or Firm* — JCIPRNET

(57) ABSTRACT

The disclosure provides a display panel including a substrate, an active layer, a first electrode layer, a common electrode layer, a cathode layer, and a spacer. The active layer is located on the substrate. The first electrode layer is located on the active layer, and the first electrode layer includes a first gate and a second gate. The common electrode layer is located on the first electrode layer. The common electrode layer has a first region, a second region, and a first necking region. The first necking region connects the first region and the second region. The first region and the first gate are correspondingly disposed, and the second region and the second gate are correspondingly disposed. The cathode layer is located on the common electrode layer. The spacer is located between the common electrode layer and the cathode layer. The spacer and the first necking region are correspondingly disposed.

12 Claims, 5 Drawing Sheets

DISPLAY PANEL COMMON ELECTRODE REGIONS CONNECTED BY NECKING REGION

CROSS-REFERENCE TO RELATED APPLICATION

This is a continuation application of and claims the priority benefit of U.S. application Ser. No. 15/925,794, filed Mar. 20, 2018, now allowed, which claims the priority benefit of China application serial no. 201710168848.9, filed on Mar. 21, 2017. The entirety of each of the above-mentioned patent applications is hereby incorporated by reference herein and made a part of this specification.

BACKGROUND

Technical Field

The disclosure relates to a display panel.

Description of Related Art

The display panel has been widely applied in various electronic products in recently years. With the prevalence of display panels, the display technology is being developed towards higher display quality and higher display stability. For example, in a display panel, the layout design of a drive circuit generally has a significant effect on the display quality. Furthermore, configurational relationships among conductive components in the drive circuit need to be adjusted according to different circuit layouts.

SUMMARY

The disclosure relates to a display panel and provides a display panel of excellent quality through a layout design of components.

A display panel according to an embodiment of the disclosure includes a substrate, an active layer, a first electrode layer, a common electrode layer, a cathode layer, and a spacer. The active layer is located on the substrate. The first electrode layer is located on the active layer, and the first electrode layer includes a first gate and a second gate. The common electrode layer is located on the first electrode layer. The common electrode layer has a first region, a second region, and a first necking region. The first necking region connects the first region and the second region. The first region and the first gate are correspondingly disposed, and the second region and the second gate are correspondingly disposed. The cathode layer is located on the common electrode layer. The spacer is located between the common electrode layer and the cathode layer, and the spacer and the first necking region are correspondingly disposed.

The display panel of the embodiment of the disclosure exhibits stable and excellent display quality.

BRIEF DESCRIPTION OF THE DRAWINGS

The accompanying drawings are included to allow further understanding of the disclosure, and the drawings are incorporated into the specification and form a part of the specification. The drawings illustrate the embodiments of the disclosure and the drawings and the description together are used to interpret the principles of the disclosure.

DESCRIPTION OF THE EMBODIMENTS

Figure 1:
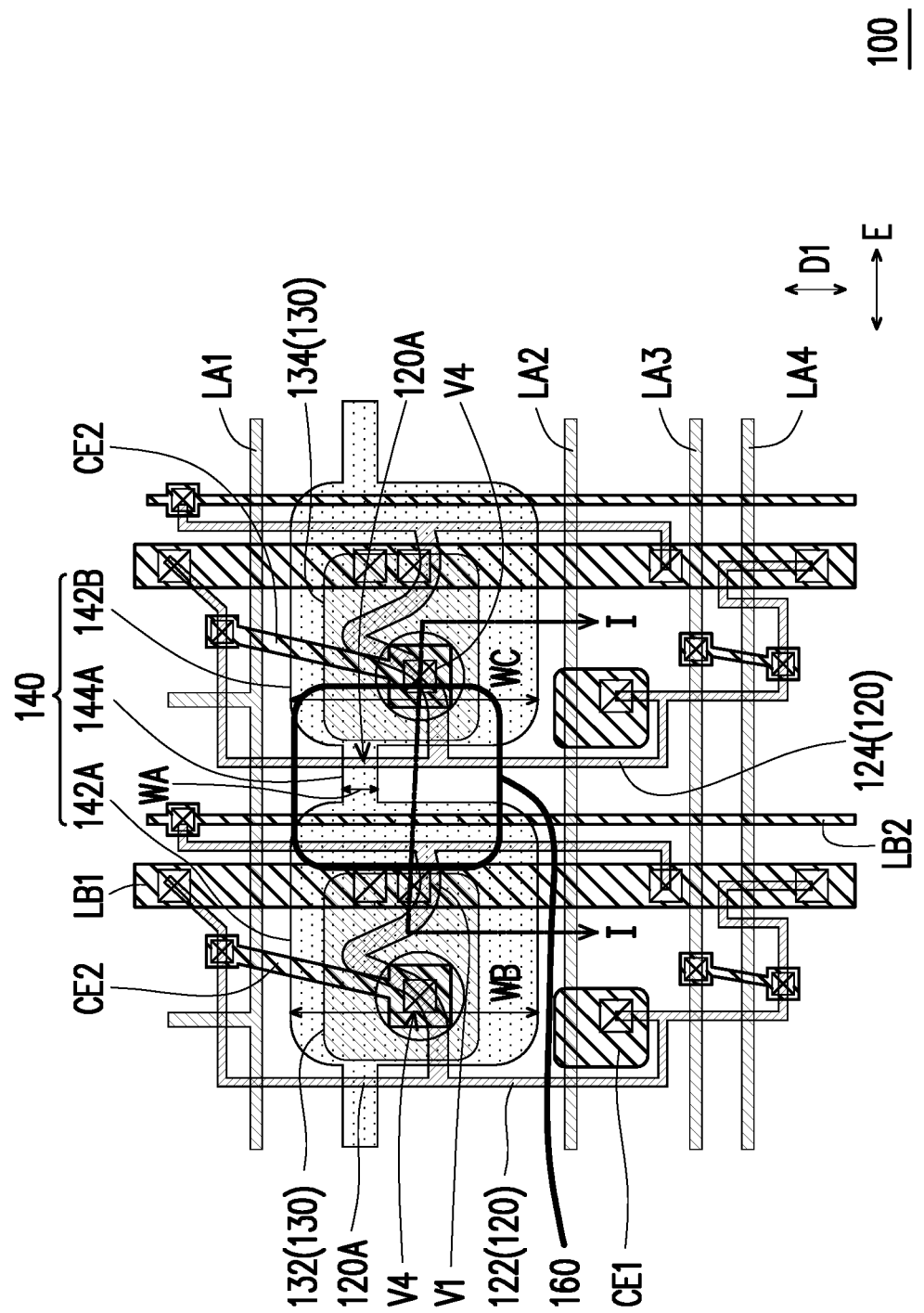
FIG. 1 is a schematic diagram illustrating a partial top view of a display panel according to an embodiment of the disclosure.

In the disclosure, a description of a structure (or a layer, component, substrate, etc.) being located on another structure (or another layer, component, substrate, etc.) may mean that the two structures are adjacent to each other and are directly connected, and a lower surface of one of the structures is adjacent and directly connected to an upper surface of the other one of the structures. Alternatively, such description may mean that the two structures are adjacent to each other but are not directly connected, and at least one intermediary structure (or an intermediary layer, intermediary component, intermediary substrate, intermediary spacing, etc.) exists between the two structures, wherein a lower surface of one of the structures is adjacent or directly connected to an upper surface of the intermediary structure, an upper surface of the other one of the structures is adjacent or directly connected to a lower surface of the intermediary structure, and the intermediary structure may be formed of a monolayer or multilayer physical structure or non-physical structure, which is not limited in the disclosure.

Electrical connection or coupling as described in the disclosure may refer to direct connection and/or indirect connection. In the case of direct connection, ends of two components on a circuit are directly connected or are connected via a conductor line segment. In the case of indirect connection, a combination of one or two of devices including a switch, a diode, a capacitor, an inductor, and other non-conductor line segments and at least one conductive segment or resistor exists between ends of two components on a circuit.

In the disclosure, error to a certain degree may exist in any two values or direction for comparison. Where a first value is equal to a second value, it is implied that an error of about 10% may exist between the first value and the second value. Where a first direction is perpendicular to a second direction, an angle between the first direction and the second direction may be 80° to 100°. Where the first direction is parallel to the second direction, the angle between the first direction and the second direction may be 0° to 10°.

In the disclosure, a "light emission color" of a light-emitting layer refers to an electromagnetic radiation generated by the light-emitting layer and received by the eyes of the observer. More specifically, the electromagnetic radiation is generated after an electrical current flowing through the light emitting layer. In that case, different light emission colors correspond to different colors. Alternatively, it is also possible that the electromagnetic radiation is invisible light. In that case, after the electromagnetic radiation is measured by a device, a corresponding spectrum is obtained, and different light emission colors correspond to different spectra.

In the disclosure, the various embodiments described below may be implemented in combination without departing from the spirit and scope of the disclosure. For example, part of features of one embodiment may combine with part of features of another embodiment to form still another embodiment.

The following text details exemplary embodiments of the disclosure, examples of which are illustrated in the accompanying drawings. Wherever possible, the same reference numeral refers to the same or similar part in the drawings and description.

Figure 2:
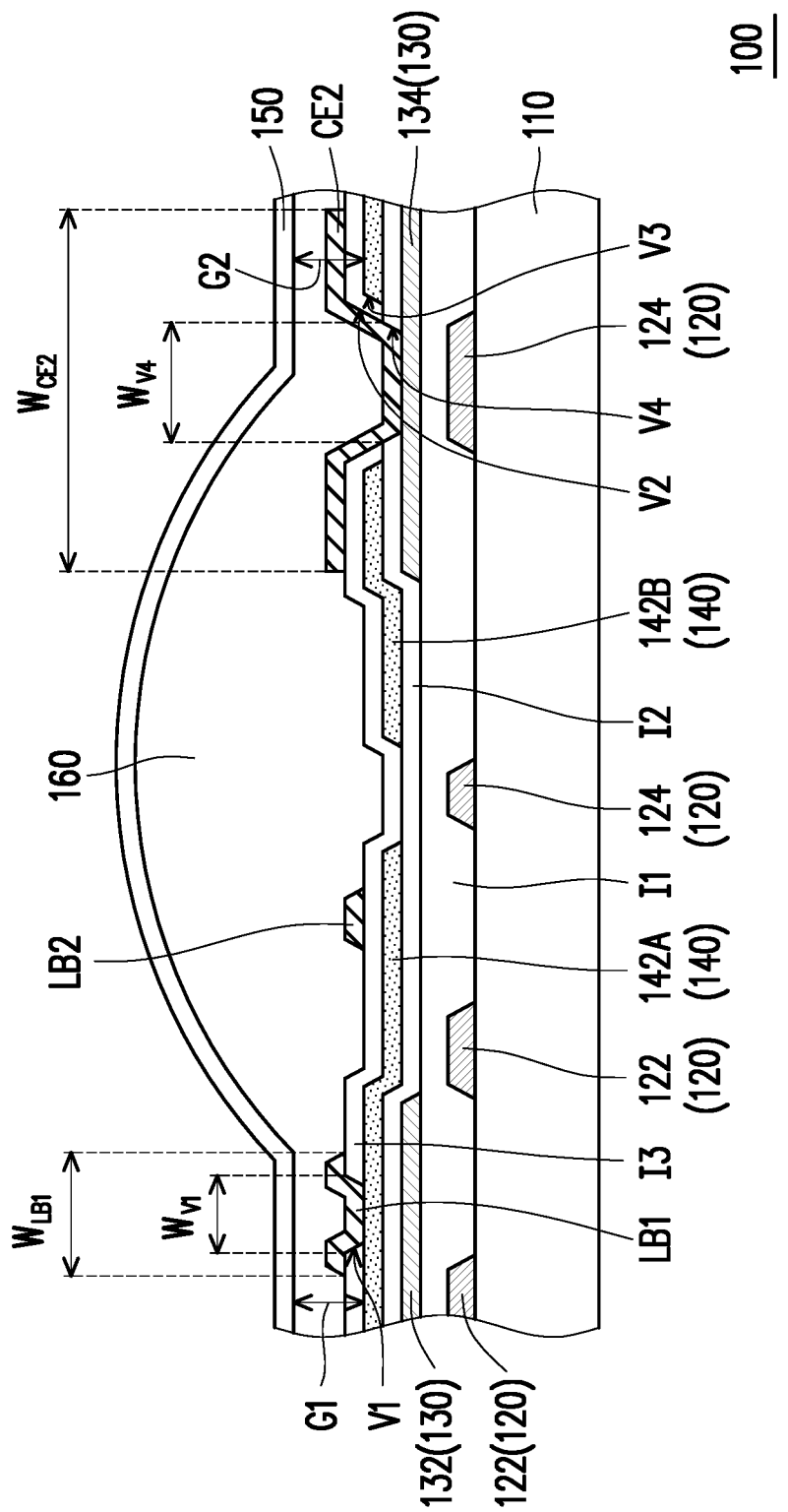
FIG. 2 is a cross-sectional schematic diagram taken along line I-I of FIG. 1.

FIG. 1 is a schematic diagram illustrating a partial top view of a display panel according to an embodiment of the disclosure, and FIG. 2 is a cross-sectional schematic diagram taken along line I-I of FIG. 1. Referring to FIG. 1 and FIG. 2, a display panel 100 includes a substrate 110, an active layer 120, a first electrode layer 130, a common electrode layer 140, a cathode layer 150, and a spacer 160. The active layer 120 is located on the substrate 110. The first electrode layer 130 is located on the active layer 120. The common electrode layer 140 is located on the first electrode layer 130. The cathode layer 150 is located on the common electrode layer 140. The spacer 160 is located between the common electrode layer 140 and the cathode layer 150. In the present embodiment, the substrate 110 is, for example, a flexible substrate or a rigid substrate. A material of the flexible substrate includes a plastic material such as polyimide (PI), polyethylene terephthalate (PET), and polycarbonate (PC). A material of the rigid substrate includes glass, quartz, ceramics, wafer or sapphire, but the disclosure is not limited hereto. Moreover, in all of the embodiments of the disclosure, since the substrate 110 and the cathode layer 150 are continuous layered structures, contours of these components are not shown in the top view. However, it does not mean that these components are not present in the embodiments represented by the drawings.

In the present embodiment, the active layer 120 includes, for example, a first active layer pattern 122 and a second active layer pattern 124. Pattern layouts of the first active layer pattern 122 and the second active layer pattern 124 may be adjusted according to a design of a drive circuit as required by the display panel 100. The pattern layouts shown in FIG. 1 are merely illustrative and are not meant to limit the specific layouts of the active layer 120. Moreover, the active layer 120 includes, for example, a semiconductor material and thus exhibits semiconductor properties. The semiconductor material includes, for example, a silicon semiconductor material such as crystalline silicon, amorphous silicon, and polycrystalline silicon, an oxide semiconductor material, or an organic semiconductor material.

The first electrode layer 130 includes a first gate 132 and a second gate 134. The first gate 132 corresponds to the first active layer pattern 122, and the second gate 134 corresponds to the second active layer pattern 124. An orthogonal projection area of the first gate 132 on the substrate 110 overlaps an orthogonal projection area of the first active layer pattern 122 on the substrate 110, and an orthogonal projection area of the second gate 134 on the substrate 110 overlaps an orthogonal projection area of the second active layer pattern 124 on the substrate 110. It is noted that the description of one orthogonal projection area overlapping another orthogonal projection area covers two aspects, i.e., fully overlap between the two and partially overlap between the two, and the disclosure is not limited to either of them. Alternatively, the first gate 132 is stacked above the first active layer pattern 122 in a thickness direction, and the second gate 134 is stacked above the second active layer pattern 124 in the thickness direction. Pattern layouts of the first gate 132 and the second gate 134 may be adjusted according to the design of the drive circuit as actually required. A material of the first electrode layer 130 includes a conductive material such as metal, metal alloy, conductive oxide, and organic conductive materials. Moreover, the first electrode layer 130 may be formed of one single conductive material layer or may be formed by stacking a plurality of conductive material layers.

The common electrode layer 140 has a first region 142A, a second region 142B, and a first necking region 144A. In the present embodiment, the common electrode layer 140 has an extension direction E, and the first region 142A, the first necking region 144A, and the second region 142B are sequentially arranged along the extension direction E. Moreover, the first necking region 144A connects the first region 142A and the second region 142B. In other words, the first necking region 144A is located between the first region 142A and the second region 142B. The first region 142A and the first gate 132 are correspondingly disposed, and the second region 142B and the second gate 134 are correspondingly disposed. For example, as shown in FIG. 1, an orthogonal projection area of the first region 142A on the substrate 110 overlaps an orthogonal projection area of the first gate 132 on the substrate 110, and an orthogonal projection area of the second region 142B on the substrate 110 overlaps an orthogonal projection area of the second gate 134 on the substrate 110. In other embodiments, the first region 142A and the first gate 132 may be correspondingly disposed in a manner that the orthogonal projection areas of the two do not overlap. Moreover, the second region 142B and the second gate 134 may be correspondingly disposed in a manner that the orthogonal projection areas of the two are configured not to overlap. In addition, as shown in FIG. 2, the first region 142A and the first gate 132 are stacked in the thickness direction, and the second region 142B and the second gate 134 are stacked in the thickness direction.

In FIG. 1, when a direction perpendicular to the extension direction E is defined as a first direction D1, a width WA of the first necking region 144A in the first direction D1 is smaller than a first width WB of the first region 142A in the first direction D1 and is also smaller than a second width WC of the second region 142B in the first direction D1. In other words, the first necking region 144A may be regarded as a region that is relatively narrow in width in the common electrode layer 140. Here, the first width or the second width refers to a width as measured of a portion or region having a greater width compared to the rest portions of a region to be measured. Therefore, the first width or the second width may also be understood as a relatively greater width in the region to be measured. In other embodiments, the first necking region 144A may be defined as a portion having a width in the first direction D1 that is smaller than or equal to half of the maximum width of the common electrode layer 140 in the first direction D1. In the disclosure, being perpendicular means that an intersected angle of two directions on a plane is 90°±10°, or that the intersected angle is in a range close to 90°, e.g., in a range of 85° to 105°.

In the present embodiment, the spacer 160, as shown in FIG. 2, is a structure that is relatively protruding with respect to a surrounding region on the substrate 110. It is noted that the surrounding region shall be understood as a region surrounding the spacer. Moreover, as shown in FIG. 1, a configurational position of the spacer 160 corresponds to the first necking region 144A. In other words, an orthogonal projection area of the spacer 160 on the substrate 110 overlaps with an orthogonal projection area of the first necking region 144A on the substrate 110. Alternatively, the spacer 160 is stacked above the first necking region 144A in the thickness direction. Meanwhile, a portion 120A of the active layer 120 intersects with the first necking region 144A, and the portion 120A extends out of the first necking region 144A. In addition to corresponding to the first necking region 144A, the spacer 160 also corresponds to the portion 120A of the active layer 120. The description of the portion 120A of the active layer 120 intersecting with the first necking region 144A may be understood as the portion 120A of the active layer 120 partially overlapping the first necking region 144A when viewed from the top view.

As shown in FIG. 2, the cathode layer 150 covers a surface of the spacer 160, and the spacer 160 is located between the cathode layer 150 and the common electrode layer 140. When a voltage difference of electrical signals transmitted by the cathode layer 150 and the common electrode layer 140 is great, a discharge phenomenon may occur between the cathode layer 150 and the common electrode layer 140. When such discharge phenomenon occurs in the first necking region 144A, the first necking region 144A may be damaged, resulting in a disconnected wire or poor conduction. In the present embodiment, a thickness of the spacer 160 is relatively thick, which increases a spacing distance between the cathode layer 150 and the common electrode layer 140. Such configuration contributes to reducing the occurrence of the discharge phenomenon between the cathode layer 150 and the common electrode layer 140 and prevents damage to the first necking region 144A. Accordingly, the display panel 100 exhibits ideal quality and is not subjected to the unwanted discharge phenomenon between the conductive components. Therefore, in another sense, correspondingly disposing the spacer 160 and the first necking region 144A may be understood as disposing the spacer 160 at a position below the cathode layer 150 corresponding to the first necking region 144A, which increases the distance between the cathode layer 150 and the first necking region 144A and reduces the risk of a wire disconnection due to damage to the first necking region 144A caused by the charge phenomenon. In an embodiment, a distance between the cathode layer 150 and the common electrode layer 140 may differ according to different regions of the common electrode layer 140. For example, in a cross-sectional direction of line I-I, a first distance G1 is defined as a distance between the first region 142A and the cathode layer 150, and a second distance G2 is defined as a distance between the second region 142B and the cathode layer 150. There is a distance between the first necking region 144A and the cathode layer 150 in a cross-section parallel to the cross-sectional line I-I, wherein the distance is greater than the first distance G1 and is greater than the second distance G2. Although the first necking region 144A is not shown in FIG. 2, it is understood that since the spacer is located between the first necking region 144A and the cathode layer 150, the distance between the first necking region 144A and the cathode layer 150 will be greater than the first distance G1 and the second distance G2. Here, the distance between a specified region of the common electrode layer 140 and the cathode layer 150 refers to a greater distance within the specified region to be measured.

In addition to the foregoing components, the display panel 100 further includes, for example, signal lines LA1, LA2, signal lines LB1, LB2, and connection components CE1, CE2, among others. The signal lines LA1, LA2 are, for example, signal lines in transverse directions, and the signal lines LB1, LB2 are, for example, signal lines in longitudinal directions. The connection components CE1, CE2 are configured to electrically connect the active layer 120 with other components. In terms of the connection component CE2, the connection component CE2 crosses over the signal line LA1 and is configured to electrically connect the first gate 132 with the first active layer pattern 122 of the active layer 120. In that case, since the first region 142A of the common electrode layer 140 corresponds to the first gate 132 and is located between the first gate 132 and the connection component CE2, the first region 142A may be provided with a corresponding contact hole (V2) to provide connection between the first gate 132 and the connection component CE2. In an embodiment, the signal line LB1 is, for example, a power line, and the signal line LB2 is, for example, a data line.

In the present embodiment, the signal lines LA1, LA2 are, for example, components formed of the first electrode layer 130 (also referred to as an M1 layer), and the signal lines LB1, LB2 and the connection components CE1, CE2 are, for example, formed of the same conductive layer (e.g., a second electrode layer, which also forms a M2 layer). In terms of a stacking sequence of the electrode layers, the common electrode layer 140 is located, for example, between the first electrode layer (M1 layer) and the second electrode layer (M2 layer) and is also referred to as an M' layer. In other words, the common electrode layer (M' layer) is located between the second electrode layer (M2 layer), which forms the signal lines LB1, LB2 and the connection components CE1, CE2, and the first electrode layer (M1 layer). In the present embodiment, the M1 layer, the M' layer, and the M2 layer may be respectively formed of conductive materials such as metals, metal alloys, conductive oxides, organic conductive materials, etc. Moreover, the M1 layer, the M' layer, and the M2 layer may be respectively formed of one single conductive material layer or may be formed by stacking a plurality of conductive material layers.

The display panel 100 further includes a first insulating layer I1 to a third insulating layer I3, wherein the first insulating layer I1 is located between the active layer 120 and the M1 layer (the first electrode layer 130), the second insulating layer I2 is located between the M1 layer (the first electrode layer 130) and the M' layer (the common electrode layer 140), and the third insulating layer I3 is located between the M' layer (the common electrode layer 140) and the M2 layer (the second electrode layer). The first insulating layer I1 to the third insulating layer I3 are configured to separate different electrode layers to enable the components formed by each of the electrode layers to provide independent electrical transmission and realize the required drive circuit layout. As shown in FIG. 2, a first contact hole V1, a second contact hole V2, a third contact hole V3, and a fourth contact hole V4 may be further provided in the display panel 100. The first contact hole V1 penetrates through the third insulating layer I3 to allow the signal line LB1 to be connected to the first region 142A of the common electrode layer 140 via the first contact hole V1. In that case, the signal line LB1 is, for example, a power line. The second contact hole V2 also penetrates through the third insulating layer I3, and the second contact hole V2 is connected to the fourth contact hole V4 penetrating through the second insulating layer I2 to allow the connection component CE2 to be connected to the second gate 134 via the second contact hole V2 and the fourth contact hole V4. Meanwhile, the third contact hole V3 is disposed in the common electrode layer 140, and the third insulating layer I3 extends to the third contact hole V3 so that the connection component CE2 does not contact the common electrode layer 140. In other embodiments, the second contact hole V2, the third contact hole V3, and the fourth contact hole V4 may also be disposed at positions corresponding to the first gate 132 to allow the first gate 132 to be connected with the connection component CE2. In the present embodiment, a dash line connecting the first contact hole V1 and the fourth contact hole V4 is used as the cross-sectional direction. In detail, a direction of a dash line connecting a center of the first contact hole V1 and a center of the fourth contact hole V4 is used as the cross-sectional direction. In the cross-sectional direction, a ratio of a width $W_{LB1}$ of the signal line LB1, also called as the power line, to a width $W_{V1}$ of the first contact hole V1 is smaller than a ratio of a width $W_{CE2}$ of the connection component CE2 to a width $W_{V4}$ of the fourth contact hole V4. Through the foregoing design, the connection component CE2 which penetrates through two insulating layers can tolerate a greater process error compared to the signal line LB1 which penetrates through one insulating layer, and the connection component CE2 can still be electrically connected to the second gate 134. Specifically, the ratio of the width $W_{LB1}$ of the signal line LB1 to the width $W_{V1}$ of the first contact hole V1 is 1.0 to 1.5, for example, and the ratio of the width $W_{CE2}$ of the connection component CE2 to the width $W_{V4}$ of the fourth contact hole V4 is 1.5 to 3.0, for example. However, the foregoing numerical ranges are merely illustrative, and the disclosure is not limited thereto.

Figure 3:
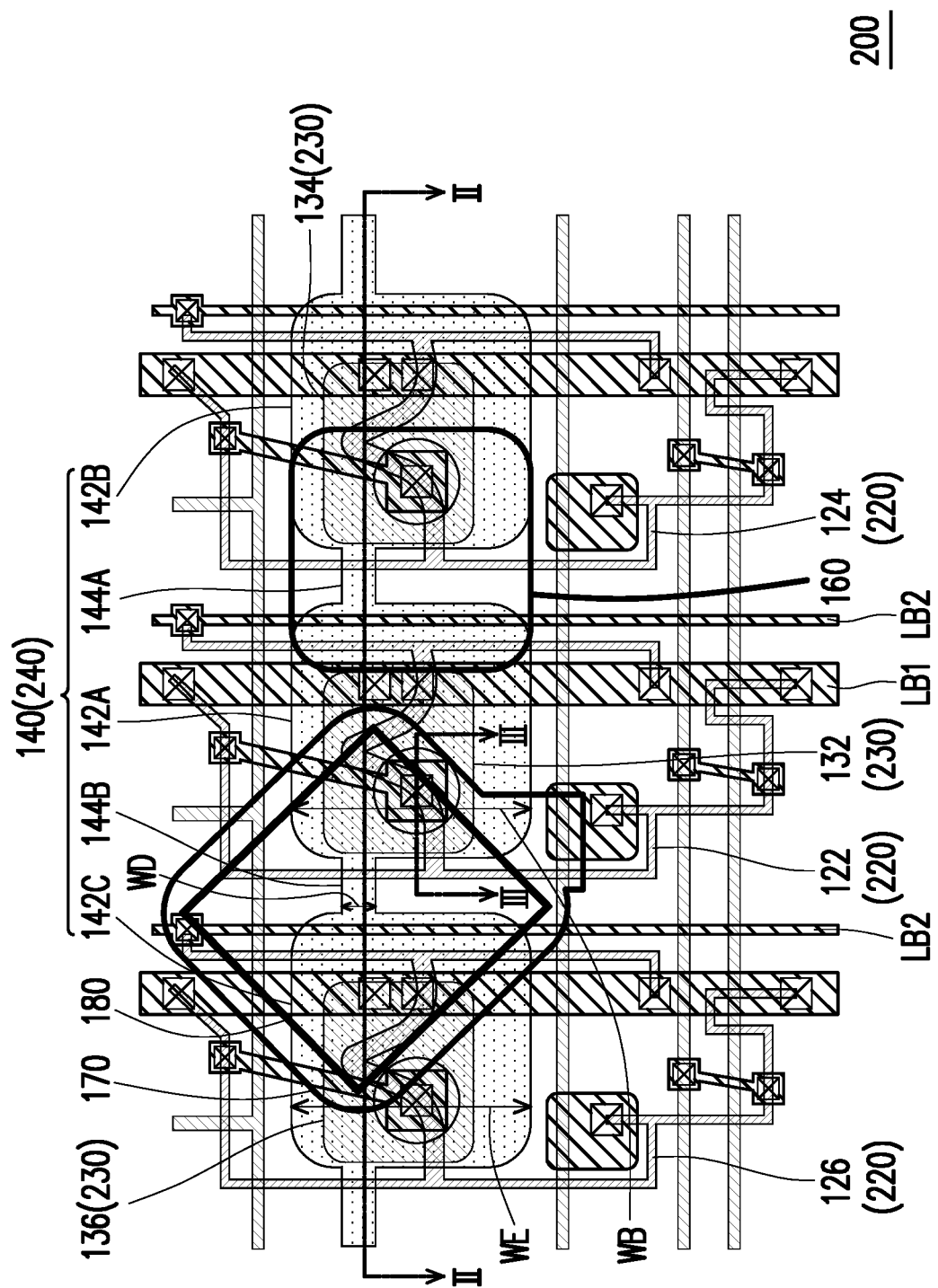
FIG. 3 is a schematic diagram illustrating a partial top view of a display panel according to another embodiment of the disclosure.
Figure 4:
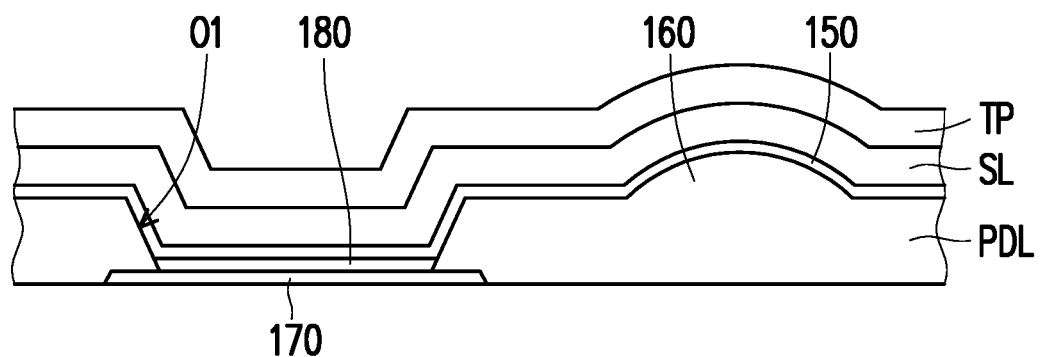
FIG. 4 is a cross-sectional schematic diagram taken along line II-II of FIG. 3 illustrating an anode layer, a light-emitting layer, a cathode layer, a pixel defining layer, and a spacer in the display panel.

FIG. 3 is a schematic diagram illustrating a partial top view of a display panel according to another embodiment of the disclosure, and FIG. 4 is a cross-sectional schematic diagram taken along line II-II of FIG. 3 illustrating an anode layer, a light-emitting layer, a cathode layer, a pixel defining layer, and a spacer in the display panel. Referring to FIG. 3 and FIG. 4, a display panel 200 includes a substrate (not shown in FIG. 3 and FIG. 4; reference may be made to FIG. 2), an active layer 220, a first electrode layer 230, a common electrode layer 240, a cathode layer 150, a spacer 160, an anode layer 170, and a light-emitting layer 180. The anode layer 170 is located between the common electrode layer 240 and the cathode layer 150. Reference may be made to the configurations of the active layer 120, the first electrode layer 130, the common electrode layer 140, the cathode layer 150, and the spacer 160 in the foregoing embodiment for configurations of the active layer 220, the first electrode layer 230, the common electrode layer 240, the cathode layer 150, and the spacer 160, which will not be repeatedly described here. Specifically, in the present embodiment, in addition to the first active layer pattern 122 and the second active layer pattern 124 in the foregoing embodiment, the active layer 220 further includes a third active layer pattern 126. In addition to the first gate 132 and the second gate 134 in the foregoing embodiment, the first electrode layer 130 further includes a third gate 136. In addition to the first region 142A, the second region 142B, and the first necking region 144A in the foregoing embodiment, the common electrode layer 240 further includes a third region 142C and a second necking region 144B. Moreover, a sealing layer SL and a touch electrode TP may be further located on the cathode layer 150, wherein the sealing layer SL is located between the cathode layer 150 and the touch electrode TP. The sealing layer SL includes, for example, an inorganic layer, an organic layer, or an inorganic-organic-inorganic composite layer. The touch electrode TP is, for example, a monolayer or multilayer touch sensing electrode.

As shown in FIG. 3, the third region 142C and the third gate 136 are correspondingly disposed. The second necking region 144B is connected to the first region 142A and the third region 142C, wherein the active layer 220 intersects with the second necking region 144B, and the anode layer 170 and the second necking region 144B are correspondingly disposed. In other words, when viewed from an orthogonal projection direction of the substrate (not illustrated), an orthogonal projection area of the anode layer 170 overlaps with an orthogonal projection area of the second necking region 144B. Moreover, an orthogonal projection of the data line (the signal line LB2) on the substrate (not illustrated) overlaps with the orthogonal projection of the anode layer 170 on the substrate (not illustrated). The description of the active layer 220 intersecting with the second necking region 144B may be understood as a portion of the active layer 220 partially overlapping the second necking region 144B when viewed from the top view.

Moreover, FIG. 4 merely illustrates the anode layer 170, the light-emitting layer 180, the cathode layer 150, the spacer 160, and the pixel defining layer PDL of the display panel 200, and reference may be made to FIG. 2 for the rest of the components to understand their configurational relationships in the cross-sectional structure. As shown in FIG. 4, the pixel defining layer PDL is located on the anode layer 170 and has an opening O1 exposing the anode layer 170. The spacer 160 is relatively protruding with respect to the pixel defining layer PDL in the thickness direction. In the present embodiment, the spacer 160 and the pixel defining layer PDL are manufactured in one single process. However, in other embodiments, the spacer 160 and the pixel defining layer PDL may be manufactured in different processes. In the present embodiment, a material of the spacer 160 and a material of the pixel defining layer PDL are identical. However, in other embodiments, the material of the spacer 160 and the material of the pixel defining layer PDL may be different. Moreover, the light-emitting layer 180 is patterned and located in the opening O1 of the pixel defining layer PDL, and the light-emitting layer 180 is located between the cathode layer 150 and the anode layer 170 to form a light-emitting component. However, in other embodiment, the light-emitting layer 180 may be non-patterned and continuously located on the surface of the pixel defining layer PDL. The light-emitting layer 180 is adapted to be driven by a current flowing through the cathode layer 150 and the anode layer 170 to emit light. A material of the light-emitting layer 180 is, for example, an electroluminescent material. The light-emitting layer 180 is, for example, an organic light-emitting layer, an inorganic light-emitting layer, or a light-emitting layer doped with QD (quantum dots) particles. Moreover, the light-emitting layer 180 is, for example, a blue light-emitting layer or a red light-emitting layer, or the light-emitting layer 180 may be selected to be a green light-emitting layer or a white light-emitting layer to provide color lights to achieve color display effect. In the process of manufacturing the display panel 200, the light-emitting layer 180 is formed on the anode layer 170 by deposition, for example. In the deposition process, the spacer 160 relatively protruding with respect to the surrounding region may be used to prop a deposition mask to prevent contact or friction between the mask and other components. In other embodiments, the light-emitting layer 180 may be formed on the anode layer 170 by ink-jet printing or screen printing.

Figure 5:
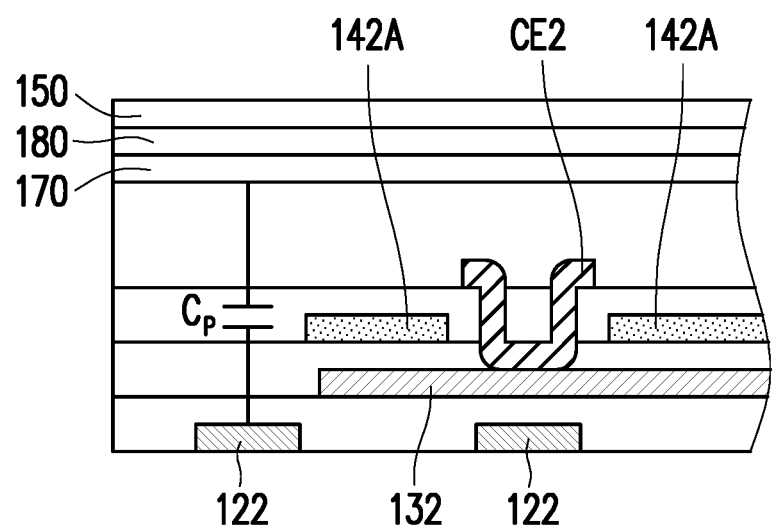
FIG. 5 is a cross-sectional schematic diagram taken along line III-III of FIG. 3.

FIG. 5 is a cross-sectional schematic diagram taken along line III-III of FIG. 3. Referring to FIG. 3 and FIG. 5, the anode layer 170 is located between the common electrode layer 140 and the cathode layer 150. The common electrode layer 140 has an extension direction, and when a line width is measured in a first direction perpendicular to the extension direction, a width WD of the second necking region 144B in the first direction is smaller than the first width WB of the first region 142A in the first direction and is also smaller than a third width WE of the third region 142C in the first direction. Here, the first width or the second width refers to a width as measured of a portion or region having a greater width within a region to be measured. Therefore, the first width or the second width may also be understood as a relatively greater width in the region to be measured. Moreover, a portion of the first active layer pattern 122 is located outside the second necking region 144B and overlaps with the area of the anode layer 170, as shown in FIG. 5. A parasitic capacitance Cp formed between this portion of the first active layer pattern 122 and the anode layer 170 contributes to stabilizing current flowing between the anode layer 170 and the cathode layer 150 and ensures stability of display quality of the display panel 200.

In all of the embodiments of the disclosure, the display panel may be further provided with a touch component to enable the display panel to also have a touch sensing function. For example, the touch electrode is located on the cathode layer to form a structure with the touch component on the display panel, i.e., a TOD (touch on display) structure. Moreover, the touch electrode may be first manufactured on another substrate, and the another substrate (touch panel) carrying the touch electrode is then attached on the display panel. Alternatively, in other embodiments, the touch electrode may be manufactured out of an existing conductive layer in the display panel to form a structure with the touch component in the display panel, i.e., a TID (touch in display) structure. In some embodiments, a portion of the touch component may be formed of the conductive layer in the display panel, and another portion may be formed of a conductive component additionally manufactured on the display panel to obtain a hybrid-type touch sensing structure. Furthermore, in addition to emitting display light by using the light-emitting layer, the display panel may also be implemented with other display media or other materials to achieve the desired display effect. For example, quantum dots may be doped into the light-emitting layer to achieve different display effect through the quantum dots. Alternatively, the display panel may be externally attached with a color filter layer to achieve the desired color display effect, or the display panel may be externally attached with a quantum dots layer to achieve quantum dots display effect.

Figure 6:
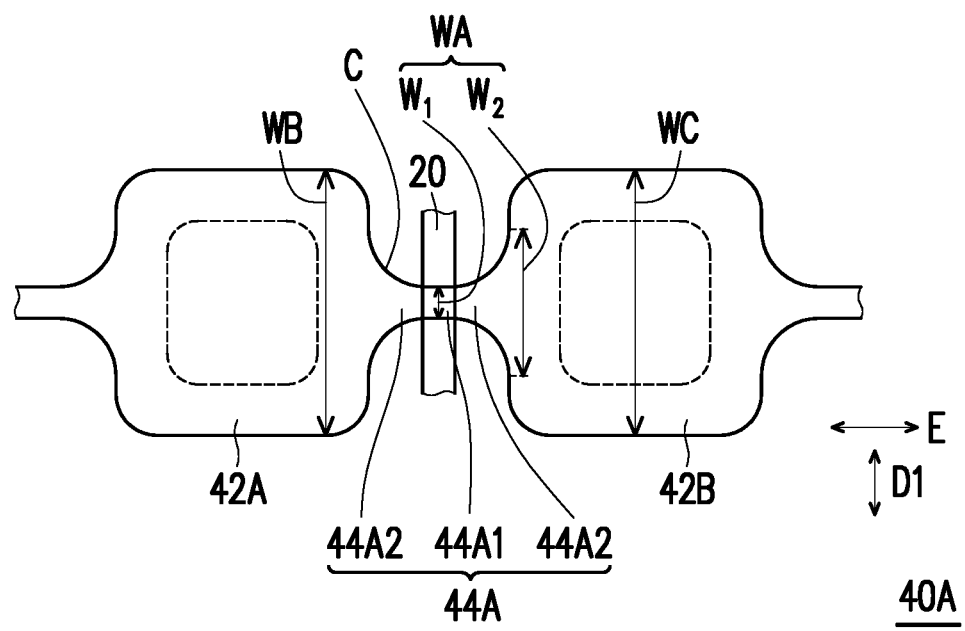
FIG. 6 is a partial schematic diagram illustrating a common electrode layer and part of an active layer according to an embodiment of the disclosure.

FIG. 6 is a partial schematic diagram illustrating a common electrode layer and part of an active layer according to an embodiment of the disclosure. Referring to FIG. 6, a common electrode layer 40A includes a first region 42A, a second region 42B, and a first necking region 44A, wherein the first necking region 44A connects the first region 42A and the second region 42B. Moreover, the active layer 20 crosses over the first necking region 44A. The first necking region 44A has an extension direction E and connects the first region 42A and the second region 42B in series along the extension direction E. When a line width is measured in a first direction D1 perpendicular to the extension direction E, a first width WB of the first region 42A in the first direction D1 is greater than a width $W_2$ of the first necking region 44A in the first direction D1, and a second width WC of the second region 42B in the first direction D1 is greater than the width $W_2$ of the first necking region 44A in the first direction D1. The maximum width $W_2$ of the first necking region 44A is not greater than (i.e., being smaller than or equal to) half of the second width WC, or is not greater than (i.e., being smaller than or equal to) half of the first width WB. Moreover, the first necking region 44A has different widths WA in different portions. For example, the first necking region 44A includes a first portion 44A1 and a second portion 44A2. The first portion 44A1 overlaps the active layer 20, and the second portion 44A2 does not overlap the active layer 20. A maximum width $W_1$ of the first portion 44A1 along the first direction D1 is smaller than the maximum width $W_2$ of the second portion 44A2 along the first direction D1. It is noted that, as shown in FIG. 6, there are two second portions 44A2 on two sides of the first portion 44A1. When the maximum widths of the two second portions 44A2 along the first direction D1 are different, the greater one is selected as the maximum width $W_2$. In addition, an edge of at least a portion of the second portion 44A2 of the first necking region 44A may be a curved edge C. In other words, the first necking region 44A may have a design where the two ends are wider and the center is narrower, and a transitional region has a width gradually reduced from the two ends towards the center. The wider design of the second portion 44A2 ensures connection between the first necking region 44A and the adjacent first region 42A or the second region 42B.

Figure 7:
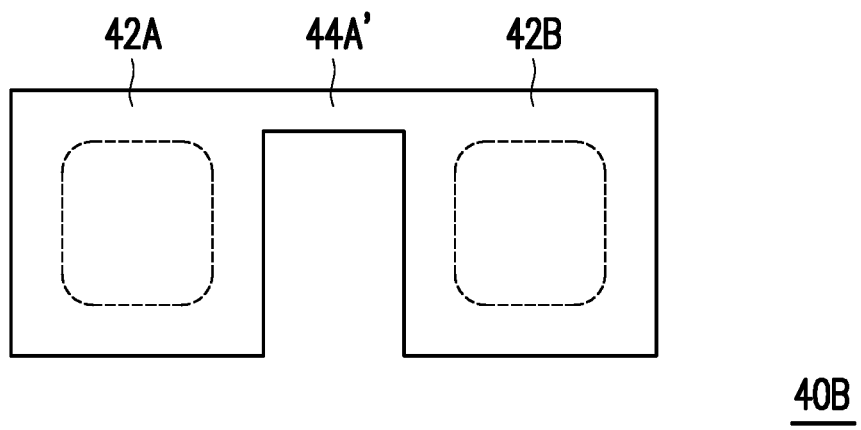
FIG. 7 is a partial schematic diagram illustrating a common electrode layer according to an embodiment of the disclosure.

FIG. 7 is a partial schematic diagram illustrating a common electrode layer according to an embodiment of the disclosure. Referring to FIG. 7, a common electrode layer 40B includes a first region 42A, a second region 42B, and a first necking region 44A', wherein the first necking region 44A' connects the first region 42A and the second region 42B, the first necking region 44A' is located between the first region 42A and the second region 42B, and an edge of the first necking region 44A' is substantially aligned with an edge of at least one of the first region 42A and the second region 42B. In other words, a pattern of the common electrode layer 40B is designed to have an approximately straight edge. The common electrode layer 40A and the common electrode layer 40B of FIG. 6 and FIG. 7 are applicable to all of the embodiments of the disclosure or any modified embodiments derived from the embodiments of the disclosure.

In summary of the above, in the display panel of the embodiments of the disclosure, the configurational position of the spacer corresponds to the necking region of the common electrode layer, so that the spacing distance between the cathode layer corresponding to the necking region and the common electrode layer is increased to reduce the occurrence of damage to the necking region by the discharge phenomenon resulting from the voltage difference between the two electrodes. Moreover, the necking region of the common electrode may correspond to the anode layer of the light-emitting component to allow the parasitic capacitance to exist between the anode layer and the active layer. Such parasitic capacitance contributes to stabilizing a drive current of the display component to enable the display panel to exhibit excellent and stable display quality.

Lastly, it shall be noted that the foregoing embodiments are meant to describe, rather than limit, the technical solutions of the disclosure. Although the foregoing embodiments have been provided to detail the disclosure, persons ordinarily skilled in the art shall be aware that they may still make modifications to the technical solutions recited in the foregoing embodiments or make equivalent replacements of part or all of the technical features therein, and these modifications or replacements do not cause the nature of the corresponding technical solutions to depart from the scope of the technical solutions of the embodiments of the disclosure.

What is claimed is:

1. A display panel comprising:
   a substrate;
   an active layer located on the substrate;
   a first electrode layer located on the active layer;
   a common electrode layer located on the active layer, wherein the common electrode layer has a first region, a second region, and a first necking region connecting the first region and the second region; and
   an anode layer located on the common electrode layer, wherein at least a portion of the active layer is located outside the first necking region of the common electrode layer and the at least the portion of the active layer and the anode layer are overlapped in a top view direction, and
   wherein the first electrode layer has a first gate and a second gate, the first region and the first gate are correspondingly disposed, and the second region and the second gate are correspondingly disposed.

2. The display panel according to claim 1, wherein the first region and the first gate are overlapped in the thickness direction, and the second region and the second gate are overlapped in the thickness direction.

3. The display panel according to claim 1, wherein an orthogonal projection area of the anode layer on the substrate and an orthogonal projection area of the first necking region on the substrate overlap with each other.

4. The display panel according to claim 1, wherein the common electrode layer has an extension direction, and a first direction is perpendicular to the extension direction, wherein the first region has a first maximum width in the first direction, the second region has a second maximum width in the first direction, and a maximum width of the first necking region in the first direction is smaller than the first maximum width and is smaller than the second maximum width.

5. The display panel according to claim 4, wherein the maximum width of the first necking region in the first direction is smaller than or equal to a half of the first maximum width.

6. The display panel according to claim 1, wherein an edge of at least a portion of the first necking region is a curved edge.

7. The display panel according to claim 1, further comprising a data line, wherein an orthogonal projection of the data line on the substrate and an orthogonal projection of the anode layer on the substrate overlap with each other.

8. The display panel according to claim 1, further comprising a power line, wherein an orthogonal projection of the power line on the substrate does not overlap an orthogonal projection of the first necking region on the substrate.

9. The display panel according to claim 1, wherein the common electrode layer further has a second necking region and a third region, and the second necking region connects the first region and the third region.

10. The display panel according to claim 1, wherein an orthogonal projection area of the first necking region intersects an orthogonal projection area of another portion of the active layer.

11. The display panel according to claim 1, wherein an orthogonal projection of the anode layer on the substrate overlaps an orthogonal projection area of the first region on the substrate and an orthogonal projection area of the second region on the substrate.

12. The display panel according to claim 1, wherein the active layer comprises a semiconductor material.

* * * * *